US012205728B2

(12) United States Patent
Bass et al.

(10) Patent No.: US 12,205,728 B2
(45) Date of Patent: Jan. 21, 2025

(54) NUCLEAR REACTOR FACILITY INTEGRATED WITH PASSIVE AIR COOLING SYSTEM

(71) Applicant: GE-Hitachi Nuclear Energy Americas LLC, Wilmington, NC (US)

(72) Inventors: Derek Bass, Wilmington, NC (US); Michael F. Dimitri, Wilmington, NC (US); Tatjana B. Kirby, Wilmington, NC (US); Luben I. Todorovski, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 150 days.

(21) Appl. No.: 17/718,733

(22) Filed: Apr. 12, 2022

(65) Prior Publication Data
US 2022/0328203 A1 Oct. 13, 2022

Related U.S. Application Data

(60) Provisional application No. 63/174,339, filed on Apr. 13, 2021.

(51) Int. Cl.
*G21C 15/18* (2006.01)
*G21C 13/02* (2006.01)
(Continued)

(52) U.S. Cl.
CPC ............. *G21C 15/18* (2013.01); *G21C 13/02* (2013.01); *G21C 13/073* (2013.01); *G21C 15/12* (2013.01)

(58) Field of Classification Search
CPC ....... G21C 15/18; G21C 13/02; G21C 13/073
(Continued)

(56) References Cited

U.S. PATENT DOCUMENTS 3,752,738 A * 8/1973 Naymark ................. G21C 9/00
376/293
4,259,154 A * 3/1981 Niino .................... G21C 13/024
376/293
(Continued)

FOREIGN PATENT DOCUMENTS

EP 0398733 A2 11/1990
FR 2506063 A1 11/1982
(Continued)

OTHER PUBLICATIONS

International Search Report and Written Opinion dated Oct. 18, 2022 issued in corresponding international patent application No. PCT/US2022/024381.

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

A nuclear reactor facility may include a reactor building, a reactor vessel housed within the reactor building, and an auxiliary cooling system integrated with the reactor building. The reactor building has a visible section above a ground level and a buried section below the ground level. The reactor vessel contains a fuel core and is housed within the buried section of the reactor building below the ground level. The auxiliary cooling system includes a plurality of ducts integrated with the reactor building and is configured to passively cool the reactor vessel via natural air circulation.

23 Claims, 7 Drawing Sheets

(51) Int. Cl.
*G21C 13/073* (2006.01)
*G21C 15/12* (2006.01)

(58) Field of Classification Search
USPC ........................................ 376/273, 298, 299
See application file for complete search history.

(56) References Cited

U.S. PATENT DOCUMENTS

| | | |
|---|---|---|
| 4,477,410 A | 10/1984 | Debru |
| 4,508,677 A | 4/1985 | Craig et al. |
| 4,678,626 A | 7/1987 | Germer |
| 4,767,594 A | 8/1988 | Hunsbedt |
| 4,959,193 A | 9/1990 | Hunsbedt et al. |
| 5,043,135 A | 8/1991 | Hunsbedt et al. |
| 5,043,136 A | 8/1991 | Hunsbedt et al. |
| 5,499,277 A | 3/1996 | Hunsbedt |
| 2022/0270770 A1 * | 8/2022 | Ganesan ................ G21C 15/18 |

FOREIGN PATENT DOCUMENTS

| | | | |
|---|---|---|---|
| JP | H06258482 A | * | 9/1994 |
| JP | 2012202988 A | * | 10/2012 |

* cited by examiner

FIG. 2
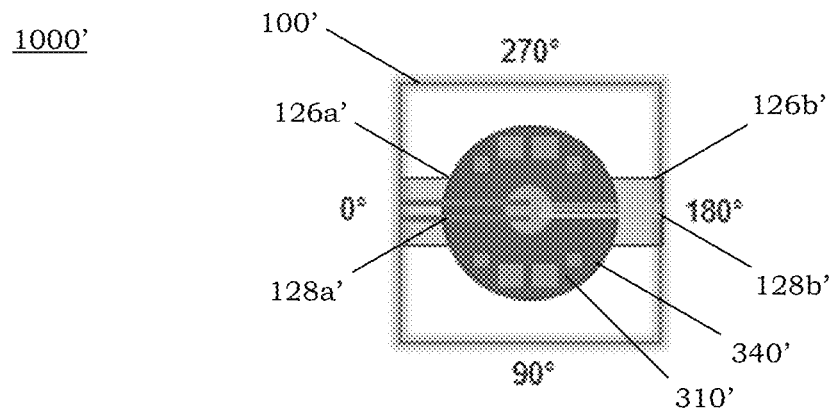
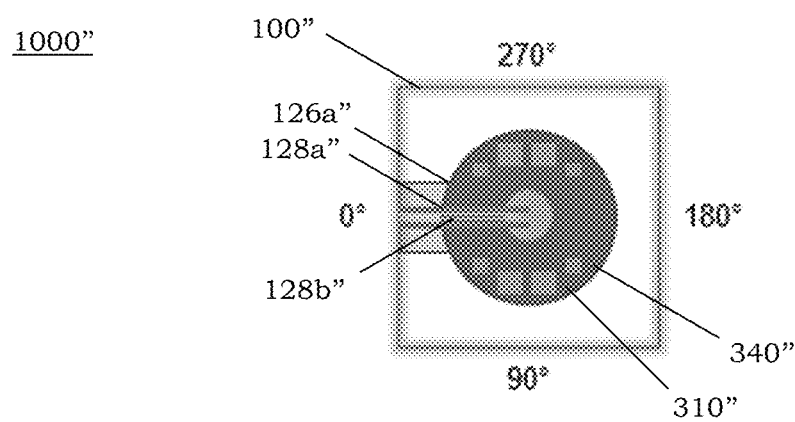
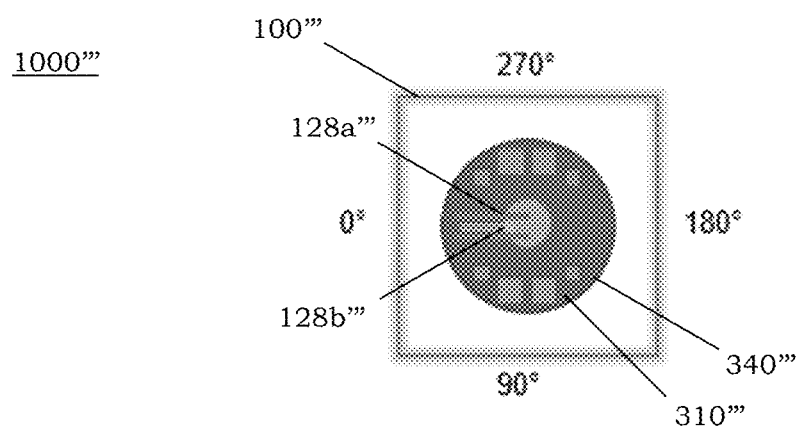

125   332   330'

FIG. 4
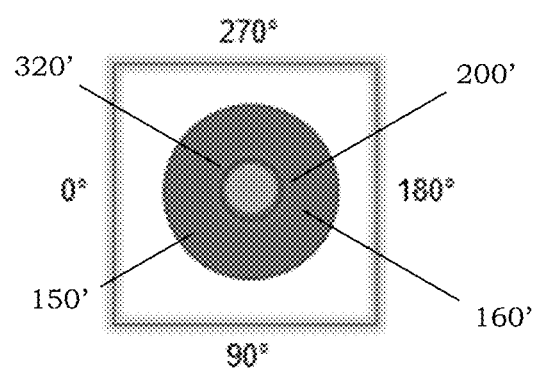
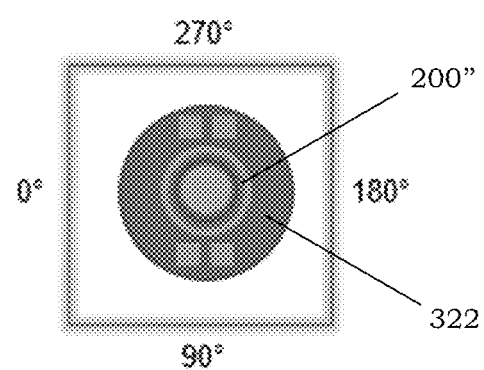

FIG. 6
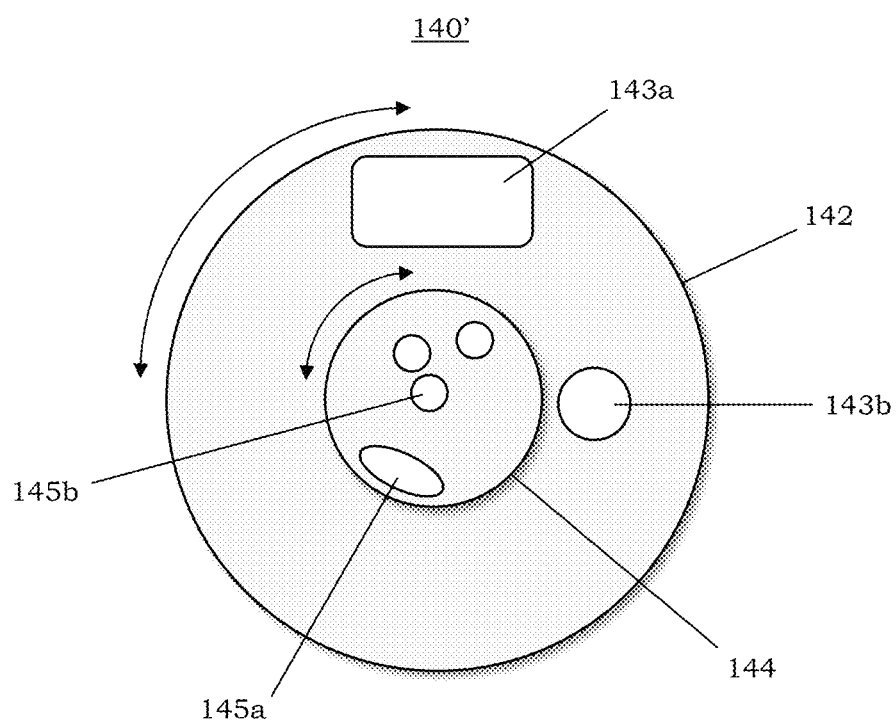
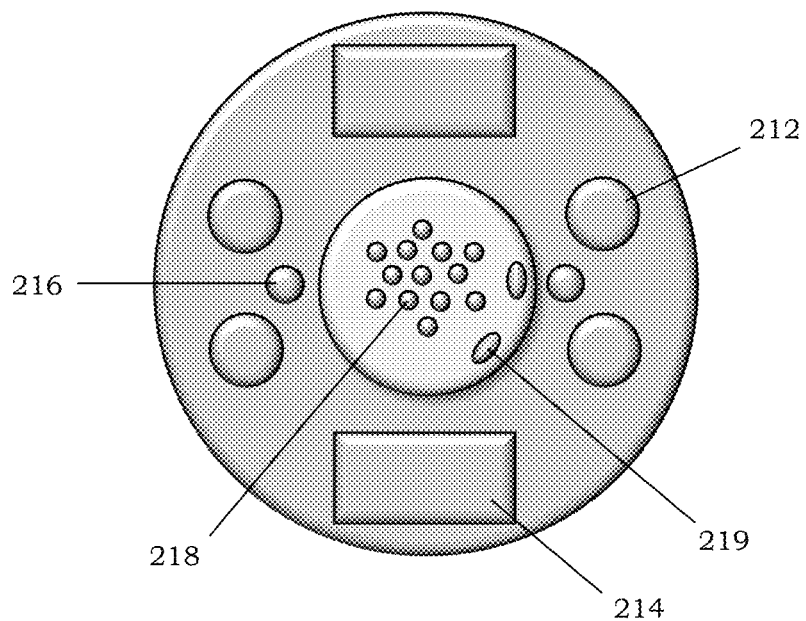

NUCLEAR REACTOR FACILITY INTEGRATED WITH PASSIVE AIR COOLING SYSTEM

CROSS-REFERENCE TO RELATED APPLICATION

The present application claims priority under 35 U.S.C. § 119 to U.S. Provisional Application No. 63/174,339, filed Apr. 13, 2021, the entire contents of which are hereby incorporated herein by reference.

BACKGROUND

Field

The present disclosure relates to the passive cooling of pool-type metal- or salt-cooled or gas-cooled nuclear reactors wherein the passive cooling system is integrated into the reactor building.

Description of Related Art

When operating nuclear reactors for power generation, it may be necessary to engage in a shut down for planned maintenance or for emergencies. Reactor shut down may involve inserting neutron-absorbing control rods into the core of fissionable fuel. However, in spite of the insertion of the control rods, the decay of the fuel will still continue to produce heat in significant amounts which must be dissipated from the nuclear reactor.

The heat capacity of the coolant (e.g., sodium, fluoride salt, chloride salt, sodium-potassium) coolant and adjacent structures aid in dissipating the residual heat. However, the structural materials of the nuclear reactor may not be capable of safely withstanding relatively high temperatures for prolonged periods of time. For example the metal of the reactor vessel may fail as a result of high temperature creep or the walls of the housing silo may splay and crack when subjected to relatively high temperatures. As a result, auxiliary cooling systems are commonly utilized to remove heat from the nuclear reactor during a shut down.

A variety of energy-driven cooling systems may be utilized to dissipate heat from the nuclear reactor. However, the energy supply to such cooling systems may make the cooling systems themselves subject to failure. For example, pumps and ventilation systems configured to cool the core may fail. Furthermore, if operator intervention is necessary, there are foreseeable scenarios in which the operator may be unable to provide the appropriate action.

SUMMARY

At least one embodiment relates to nuclear reactor facility. In an example embodiment, the nuclear reactor facility may comprise a reactor building having a visible section above a ground level and a buried section below the ground level; a reactor vessel containing a fuel core and housed within the buried section of the reactor building below the ground level; and an auxiliary cooling system including a plurality of ducts integrated with the reactor building and configured to passively cool the reactor vessel via natural air circulation.

The reactor building may define a refueling access area and a head access area below the refueling access area.

The refueling access area may be at or above the ground level, and the head access area may be below the ground level.

The refueling access area may include a refueling access floor, and the head access area may include a head access floor below the refueling access floor.

The refueling access floor may define an opening and may include a floor plug rotatably-mounted within the opening, the floor plug configured to permit access to the reactor vessel via a rotation of the floor plug.

The floor plug may be in a form of a primary floor plug and a secondary floor plug concentrically incorporated with the primary floor plug, the primary floor plug defining at least one primary port, the secondary floor plug defining at least one secondary port, the primary floor plug and the secondary floor plug configured to permit access to the reactor vessel via independent rotations of at least the primary floor plug or the secondary floor plug.

The reactor building may include a plurality of structural sleeves between the refueling access floor and the head access floor, the plurality of structural sleeves configured to support the refueling access floor while allowing the plurality of ducts of the auxiliary cooling system to pass therethrough.

The reactor building may include radial floor beams embedded in at least one of the refueling access floor or the head access floor.

The radial floor beams may include a plurality of diametrically-opposed beams arranged around a central, longitudinal axis of the reactor vessel.

Each of the plurality of ducts of the auxiliary cooling system may extend between an adjacent pair of the radial floor beams (or even multiple ducts may extend between a pair of radial beams).

Each of the plurality of ducts of the auxiliary cooling system may have a trapezoidal cross-section and may be oriented to correspond to a truncated wedge-shaped space defined by adjacent radial floor beams.

The auxiliary cooling system may include a hot plenum ring header disposed below the head access floor and around the reactor vessel, the hot plenum ring header configured to collect heated air rising along the reactor vessel.

The plurality of ducts of the auxiliary cooling system may include inlet ducts and outlet ducts, and the hot plenum ring header may be connected to and configured to direct the heated air to the outlet ducts.

The auxiliary cooling system may define a cold plenum below the head access floor, and the inlet ducts may be configured to direct cooling air into the cold plenum.

The auxiliary cooling system may include a cold plenum ring header disposed below the hot plenum ring header and connected to the inlet ducts.

The cold plenum ring header may be configured to direct cooling air from the inlet ducts to a riser annulus adjacent to the reactor vessel.

The visible section and the buried section of the reactor building may have a continuous, cylindrical form.

The buried section of the reactor building may include a first wing extension configured to facilitate a pathway for at least one of piping or cabling to pass from the reactor building to an adjacent building.

The buried section of the reactor building may include a second wing extension oppositely disposed from the first wing extension.

The plurality of ducts of the auxiliary cooling system may extend through one or more sidewalls of the reactor building.

The plurality of ducts may be arranged in an array that follows an outer contour of a circular cross-section of the reactor vessel. In one instance, the inlet ducts and/or the outlet ducts may be arranged equidistantly (e.g., concentrically) around a central, longitudinal axis of the reactor vessel.

The buried section of the reactor building may include a cylindrical silo, and the plurality of ducts may be arranged in an array that follows an inner contour of a circular cross-section of the cylindrical silo. In one instance, the inlet ducts and/or the outlet ducts may be arranged equidistantly (e.g., concentrically) around a central, longitudinal axis of the cylindrical silo.

The plurality of ducts may be arranged in opposing arrays of circular segments (e.g., arcs) around the reactor vessel. In one instance, the opposing arrays of circular segments may be concentric with a central, longitudinal axis of the reactor vessel.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 2 includes plan views of a head access area of a nuclear reactor facility showing three potential wing designs according to an example embodiment.

FIG. 4 includes plan views of a silo floor elevation below a head access area of a nuclear reactor facility showing two potential cold plenum designs according to an example embodiment.

FIG. 6 includes plan views of a floor plug and an underlying reactor head accessed via the floor plug according to an example embodiment.

DETAILED DESCRIPTION

Figure 1:
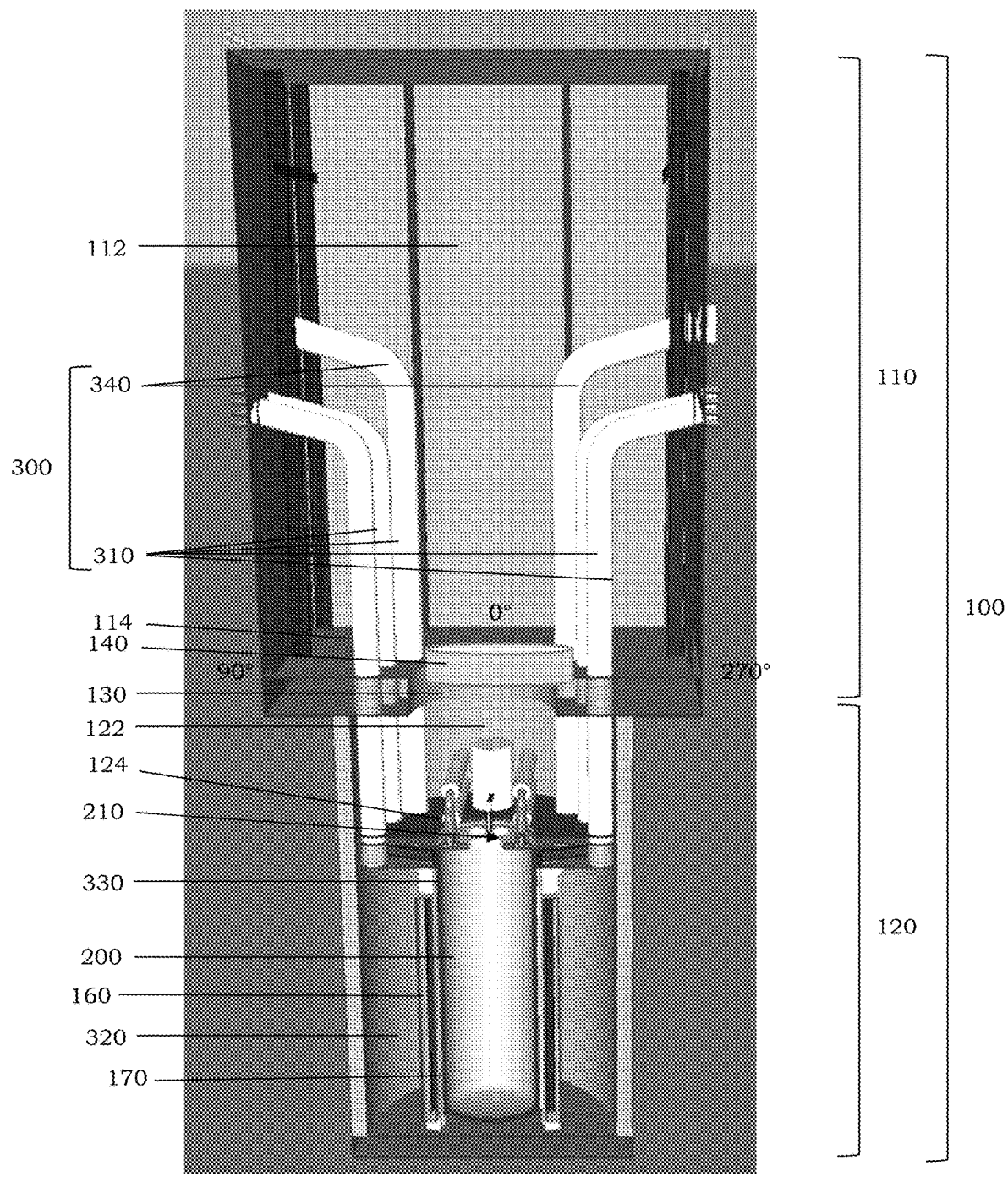
FIG. 1 is a cutaway view of a nuclear reactor facility according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

The processing circuitry may be hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

FIG. 1 is a cutaway view of a nuclear reactor facility according to an example embodiment. Referring to FIG. 1, the nuclear reactor facility 1000 may include an auxiliary cooling system 300 that is integrated with a reactor building 100 (or building housing). The auxiliary cooling system 300 is configured to passively cool the reactor vessel 200 via natural air circulation. As illustrated, the auxiliary cooling system 300 includes a plurality of ducts configured to dissipate heat away from the reactor vessel 200. In particular, the plurality of ducts of the auxiliary cooling system 300 includes inlet ducts 310 and outlet ducts 340.

During the operation of the auxiliary cooling system 300, cooling air (e.g., outside, ambient air) enters the nuclear reactor facility 1000 via the inlet ducts 310, while heated air from the proximity of the reactor vessel 200 exits the nuclear reactor facility 1000 via the outlet ducts 340. Notably, the auxiliary cooling system 300 is passive in that a power supply (e.g., electricity) is not needed for its operation. Instead, the auxiliary cooling system 300 operates automatically via natural air circulation based on the differing densities of the cooling air and the heated air. Specifically, heated air rising away from the reactor vessel 200 and exiting the nuclear reactor facility 1000 via the outlet ducts 340 will cause a natural air circulation wherein cooling air will be drawn into the nuclear reactor facility 1000 and down to the cold plenum 320 via the inlet ducts 310. Rising, heated air collected by the hot plenum ring header 330 is directed to the outlet ducts 340 so as to perpetuate the natural air circulation cycle.

The plurality of ducts of the auxiliary cooling system 300 may be vertical structures with a bend/angle in the upper end section so as to extend through sidewalls (as opposed to the ceiling) of the reactor building 100. In an example embodiment, such an angled configuration of the plurality of ducts provides the requisite clearance for the installation of an overhead crane (which may also be referred to as a bridge crane) within the reactor building 100 so as to be above the plurality of ducts. The overhead crane may include parallel runways, a traveling bridge, and a hoist. The parallel runways of the overhead crane may be mounted on opposite sidewalls of the reactor building 100 (e.g., the same sidewalls through which the plurality of ducts extend) with the traveling bridge spanning the gap. The hoist, the lifting component of the overhead crane, is configured to move along the traveling bridge. During the operation of the overhead crane (e.g., for refueling), if the traveling bridge is regarded as moving along the parallel runways in an x direction, then the hoist may be regarded as moving in a y direction, and the object being lifted may be regarded as moving in a z direction.

The plurality of ducts of the auxiliary cooling system 300 may be arranged on opposite quadrants around the reactor head 210 such that the opposing spaces of the adjacent quadrants (which do not have ducts) provide increased access to the reactor vessel 200. However, it should be understood that example embodiments are not limited thereto. Additionally, although four inlet ducts 310 and two outlet ducts 340 are shown in FIG. 1, it should be understood that other combinations are possible. Furthermore, the inlet ducts 310 and the outlet ducts 340 may be alternatively arranged (e.g., inlet duct 310, outlet duct 340, inlet duct 310, outlet duct 340, . . . ). The outlet openings for the outlet ducts 340 may be higher than the inlet openings for the inlet ducts 310. In such an instance, the possibility of the heated air exiting from the outlet ducts 340 being inadvertently drawn into the inlet ducts 310 with the cooling air can be reduced or prevented.

The reactor building 100 has a visible section 110 above a ground level and a buried section 120 below the ground level. The reactor vessel 200 contains a fuel core and is housed within the buried section 120 of the reactor building 100 below the ground level (e.g., deeply embedded). The auxiliary cooling system 300 may be a radiant vessel auxiliary cooling system, although example embodiments are not limited thereto. The integration of the auxiliary cooling system 300 with the building design, which will be discussed herein in more detail, may reduce the cost and schedule of the overall nuclear power plant design while meeting requirements of the fundamental safety feature for long term heat removal from the nuclear core.

The reactor may be of a pool type design with top entry of components of which the choice of coolant is not limiting to the present disclosure. In an example embodiment, the reactor pool is placed below ground within a silo near the center axis with one or more floors above the reactor top. The floors below ground level are collectively referred to as the head access area 122. However, the bottom flow is referred to as the silo cold plenum. On the other hand, the floors at or above ground level are collectively referred to as the refueling access area 112.

The reactor may be top vertically supported, wherein the reactor pool vessel is hung from the head access area floor and, optionally, laterally restrained at a lower location along its length. However, it should be understood that this additional lateral restraint is not required in all embodiments. Additionally, the present disclosure is not limited to the reactor being top vertically supported. For instance, in the alternative, the reactor may be bottom vertically supported. Furthermore, in other instances, the reactor may be vertically supported at another axial location along its length.

The refueling access area 112 of the reactor building 100 includes a refueling access floor 114, and the head access area 122 of the reactor building 100 includes a head access floor 124. The head access floor 124 is below the refueling access floor 114. In an example embodiment, a floor plug 140 is disposed in an opening 130 so as to form a part of the refueling access floor 114. The floor plug 140 may include smaller access ports to enable vertical access to the reactor head mounted equipment directly beneath. For instance, the floor plug 140 as well as the smaller access ports are rotatable which minimizes the total number of access ports because one port can be positioned over many reactor head equipment locations by rotating its parent port or plug.

The plurality of ducts of the auxiliary cooling system 300 pass through the refueling access area floor 114 and also through the head access area floor 124. In an example embodiment, one or more structural sleeves (e.g., structural sleeve 170 in FIG. 7) are provided between the refueling access area floor 114 and the head access area floor 124. In such an instance, the structural sleeves would act as a column supporting the refueling access area floor 114 while allowing the plurality of ducts of the auxiliary cooling system 300 to pass through the structural sleeves. As a result, the refueling access area floor 114 may have a thinner and stiffer construction.

The profile of the reactor building 100 above ground may be a continuance of the below ground round/cylindrical profile. Alternatively, the profile of the reactor building 100 may be a stepped out profile with a larger round, square, or rectangular footprint above ground in order to improve access or fit more equipment.

In an example embodiment, the profile of the reactor building 100 below ground is a straight cylinder. In such an instance, a straight excavation (as opposed to a stepped excavation) is involved. Despite a larger volume compared to a stepped design, the construction is faster, and the symmetry and round shape improves robustness for seismic events. Additionally, many or most auxiliary equipment may be intentionally excluded from the reactor building 100. This reduces project cost, because the reactor building 100 is constructed to a higher tier of nuclear standards. Essentially, in some instances, the building houses only the reactor module itself, the equipment installed into the reactor, ducts associated with reactor air cooling, HVAC, and cranes.

FIG. 2 includes plan views of a head access area of a nuclear reactor facility showing three potential wing designs according to an example embodiment. As shown in FIG. 2, there are instances when the profile of the reactor building below ground may not be a straight cylinder. The single and double wing designs for nuclear reactor facility 1000" and nuclear reactor facility 1000', respectively, incorporate a small keyway which spans from the ground elevation to the bottom of the head access area elevation. For instance, a keyway 126a " may be provided at the 0° direction for the single wing design in nuclear reactor facility 1000", while opposing keyways 126a ' and 126b ' may be provided at the 0° and 180° directions for the double wing design in nuclear reactor facility 1000'. In an example embodiment, these keyways jut out from the straight cylinder profile simply to facilitate an underground pathway for major/main process lines 128a'/128a" or auxiliary lines 128b'/128b" (e.g., piping and/or cabling) to pass out of the reactor building 100' and 100" to an adjacent auxiliary building. Examples of auxiliary systems include primary coolant cleanup, cover gas cleanup, or additional heat removal systems. The space provided by the keyway(s) also allows more room for safety-related isolation valves, if necessary, to the design (otherwise, the silo diameter may be required to be larger). On the other hand, the zero wing design in nuclear reactor facility 1000''' may be implemented for configurations where passage of the major/main process lines 128a''' or auxiliary lines 128b''' (e.g., piping and/or cabling) need not pass out of the buried section the reactor building 100''' so as to transition to adjacent buildings underground (lines instead turn upward to go above ground level before transitioning to an adjacent building). In all of the wing designs, most of the power and control cabling, HVAC ducting, HVAC piping, elevator access, stairwells, etc. may pass into the head access area through the refueling access area floor. The space between reactor cooling ducts may also be leveraged for these interconnections. The inlet ducts 310'/310"/310''' may be as discussed above in connection with the inlet ducts 310 in FIG. 1. Similarly, the outlet ducts 340'/340"/340''' may be as discussed above in connection with the outlet ducts 340 in FIG. 1. As a result, the relevant details of the ducts will not be repeated in the interest of brevity.

Figure 3:
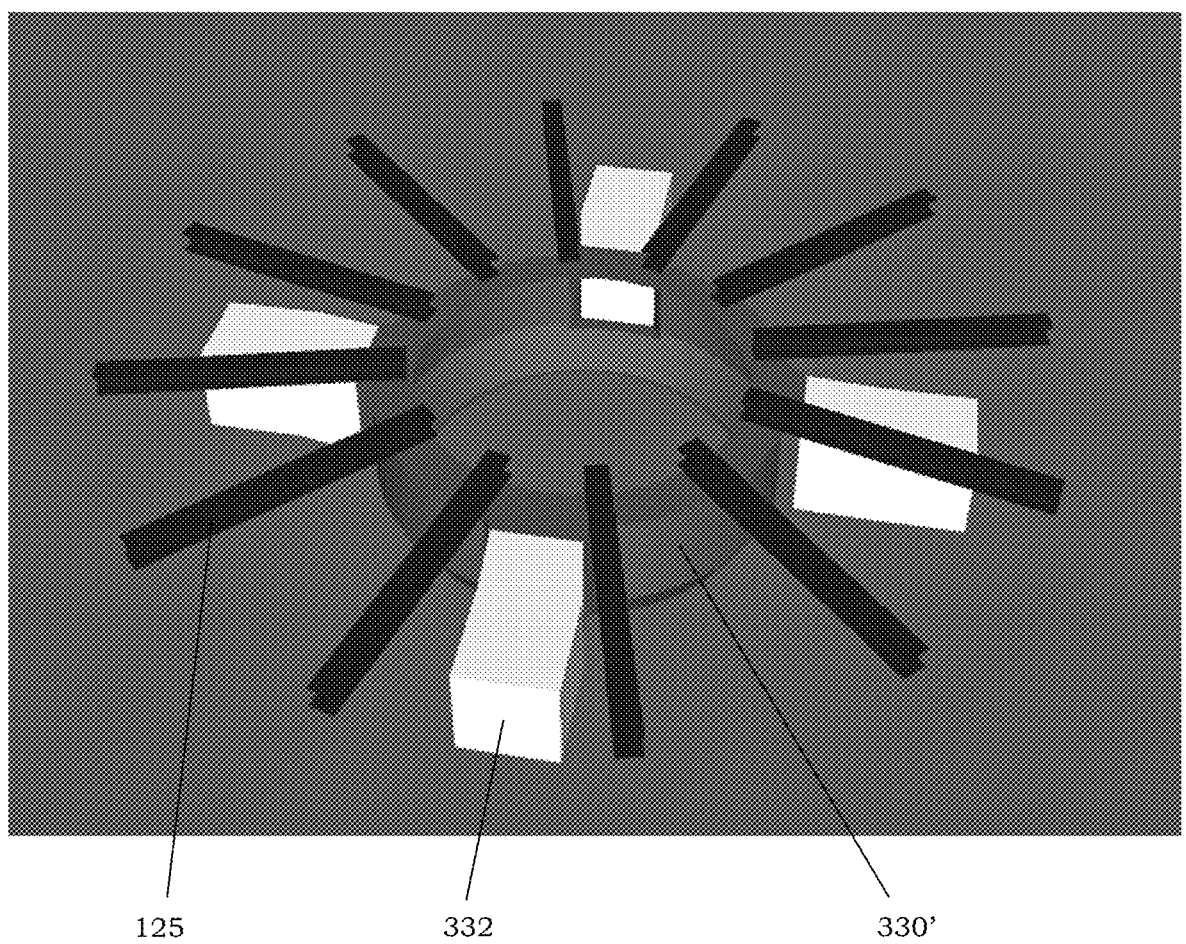
FIG. 3 is a perspective view of a hot plenum ring header with ducts connected thereto and adjacent radial floor beams according to an example embodiment.

FIG. 3 is a perspective view of a hot plenum ring header with ducts connected thereto and adjacent radial floor beams according to an example embodiment. Referring to FIG. 3, the reactor building includes radial floor beams 125 configured to support the head access area floor. For instance, the radial floor beams 125 may include a plurality of diametrically-opposed beams arranged around a center of the hot plenum ring header 330' or a central, longitudinal axis of the reactor vessel. The radial floor beams 125 may be I-beams or H-beams. Additionally, the radial floor beams 125 may be embedded in concrete. The radial floor beams 125 may be similarly used to support the refueling access area floor.

When the nuclear reactor facility is constructed, each of the plurality of ducts 332 of the auxiliary cooling system will extend between an adjacent pair of the radial floor beams 125 of the reactor building. Referring back to FIG. 3, each of the plurality of ducts 332 (e.g., outlet ducts) connected to the hot plenum ring header 330' will extend outward in a radial manner until the appropriate clearance is reached before extending upward (e.g., like outlet ducts 340 in FIG. 1) between an adjacent pair of the radial floor beams 125 of the reactor building. Thus, in at least this regard, the auxiliary cooling system may be integrated with the reactor building in that structures of the auxiliary cooling system are interspersed with the structures of the reactor building (e.g., reactor building based on a deeply-embedded cylindrical silo within a corresponding shaft).

The cross-section of the plurality of ducts 332 may be round, triangular, square, rectangular, or trapezoidal. As illustrated in FIG. 3, the distal/outer ends of the radial floor beams 125 are spaced further apart relative to the proximal/inner ends which are closer to the center of the hot plenum ring header 330' (or a central, longitudinal axis of the reactor vessel). In view of this geometry, the cross-sections of the plurality of ducts 332 of the auxiliary cooling system may be configured better utilize this space. For instance, the cross-section of the plurality of ducts 332 may have a trapezoidal shape in order to increase the available air flow area in view of the truncated wedge-shaped space defined by adjacent radial floor beams 125.

FIG. 4 includes plan views of a silo floor elevation below a head access area of a nuclear reactor facility showing two potential cold plenum designs according to an example embodiment. Referring to FIG. 4, in the silo cold plenum design for the nuclear reactor facility 2000', the inlet ducts (for the cooling air) terminate just below the head access area floor and are configured to discharge cooling air into the silo cold plenum 320'. The cold plenum is also shown, for instance, in FIG. 1. In such an instance, the head access area floor may be supported by the silo wall 150' and also by a pedestal 160' that surrounds the reactor vessel 200' (or reactor module) with a relatively close-fitting annular gap. The outer annulus defined by the inner diameter of the silo wall 150' and the outer diameter of the reactor pedestal 160' is regarded as the silo cold plenum 320'. Cooling air from the inlet ducts of the auxiliary cooling system flows downward into this space. The inner annulus 170 formed by the outer diameter of the reactor vessel 200' (or reactor module) and the inner diameter of the reactor pedestal 160' is regarded as the hot air riser. The inner diameter of the reactor pedestal 160' may include a collector cylinder with many possible heat transfer enhancement features. It is in this hot air riser where the safety-related long-term heat removal is dissipated to the ultimate heat sink, air driven by natural circulation through the passive reactor vessel cooling system. The heated air in the hot air riser is collected into a hot plenum ring header (e.g., FIG. 3) just below the head access area floor. The hot plenum ring header is configured to direct the heated air to outlet ducts of the auxiliary cooling system which discharge the heated air from the reactor building.

Figure 5:
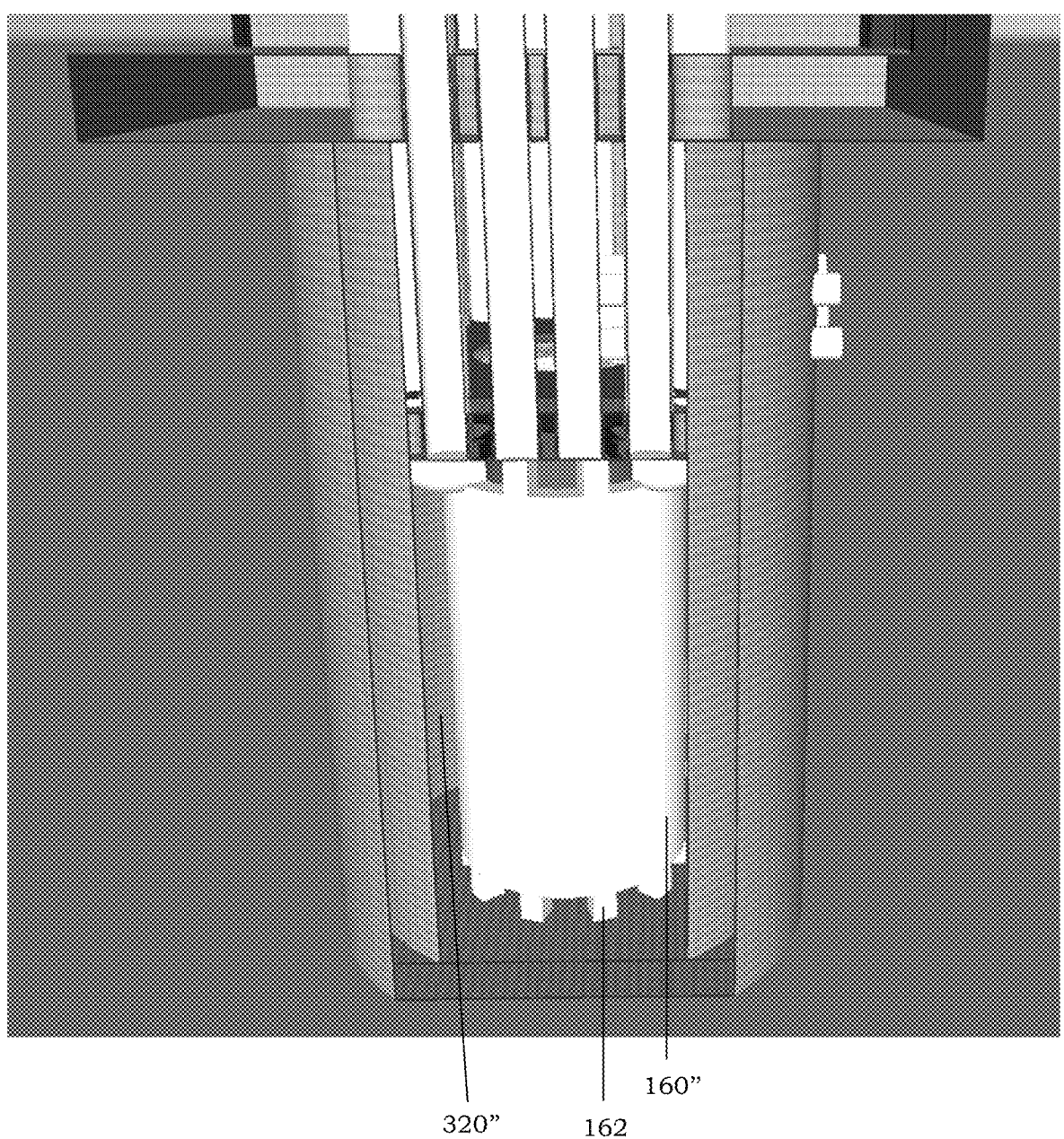
FIG. 5 is a cutaway view of a cold plenum of a nuclear reactor facility according to an example embodiment.

Alternatively, in the ring cold plenum design for the nuclear reactor facility 2000", the flow path for the heated air is the same but the flow path for the cooling air differs. For instance, instead of the inlet ducts of the auxiliary cooling system terminating below the head access area floor, the inlet ducts continue to the bottom of the silo where the cooling air is discharged into a common ring header (cold plenum ring header 322) which feeds the cooling air into the hot air riser annulus 170 surrounding the reactor vessel 200". In some example embodiments, the ring cold plenum design can yield better performance due to reduction in expansion losses, FIG. 5 is a cutaway view of a cold plenum of a nuclear reactor facility according to an example embodiment. Referring to FIG. 5 and as noted supra, cooling air from outside the reactor building is initially drawn into the reactor building and directed downward to the cold plenum 320". For instance, ambient air (above ground level) as the cooling air initially enters the inlet ducts of the auxiliary cooling system. The cooling air may then flow downward through 45° bends to transition to vertical and down through the refueling access area floor and the head access area floor. The inlet ducts may be discontinued as the cooling air is discharged into the cold plenum 320" below the head access area floor or sub-operating floor (silo cold plenum design)). The cooling air continues to the bottom of the silo where the flow enters the annulus inlets, which are openings between the cold plenum columns 162 of the reactor pedestal 160".

Once inside the pedestal 160", the flow of cooling air turns up into the annulus 170 defined by the reactor module vessel surface and the collector cylinder (attached to pedestal 160" but not shown) where it becomes a flow of heated air. Before the flow of heated air reaches the top/head of the reactor, the heated air is discharged horizontally into the hot plenum ring header (e.g., FIG. 3). The flow of heated air then splits from the hot plenum ring header so as to distribute the split flows of heated air to a number of outlet ducts (e.g., hot air chimney ducts) which rise through the head access area floor and the refueling access area floor. The heated air leaves the reactor building via the outlet ducts at an elevation above the inlet ducts for the cooling air. Because heated air rises, the possibility of the heated air being inadvertently drawn into the inlet ducts with the cooling air is reduced or prevented due to the elevation difference of the outlet ducts relative to the inlet ducts.

FIG. 6 includes plan views of a floor plug and an underlying reactor head accessed via the floor plug according to an example embodiment. Referring to FIG. 6, the floor plug 140' is configured to be rotatable and may be in the form of a primary floor plug 142 (or main floor plug) and a secondary floor plug 144 that is rotatably-incorporated with the primary floor plug 142 so as to enable independent rotations of the primary floor plug 142 and the secondary floor plug 144. In the nuclear reactor facility, the floor plug 140' forms a part of the refueling access floor and is disposed directly or vertically above the reactor head 210'. For example, in one instance, the refueling access floor defines an opening above the reactor head 210' that is configured to retain or otherwise accommodate the floor plug 140' while also allowing the floor plug 140' to undergo at least a full 360° rotation in either a clockwise direction or a counter-clockwise direction. The floor plug 140' defines ports having different sizes, shapes, quantities, and locations so as to increase the ease of access with regard to the underlying reactor head 210'.

As shown in FIG. 6, the primary floor plug 142 may define a relatively large, elongated port 143a that is configured to allow access to the larger components on the reactor head 210' (e.g., pumps 212, heat exchangers 214) when the primary floor plug 142 is rotated to provide the proper alignment between the relatively large, elongated port 143a and the components on the reactor head 210' for which access is desired. The relatively large, elongated port 143a may have a rectangular shape (e.g., rounded rectangular shape) and may be disposed closer to the periphery of the primary floor plug 142 than the center of the floor plug 140', although example embodiments are not limited thereto.

The primary floor plug 142 may additionally define a mid-size port 143b (compared to the above-discussed relatively large, elongated port 143a) that is configured to allow access to miscellaneous components 216 on the reactor head 210'. The mid-size port 143b may have a circular shape and may be disposed approximately midway between the periphery of the primary floor plug 142 and the center of the floor plug 140', although example embodiments are not limited thereto.

The secondary floor plug 144 may define a smaller, elongated port 145a (compared to the above-discussed relatively large, elongated port 143a) that is configured to allow access to other components 219 on the reactor head 210' when the secondary floor plug 144 is rotated to provide the proper alignment between the smaller, elongated port 145a and the components 219 on the reactor head 210' for which access is desired. The smaller, elongated port 145a may have an elliptical shape or a rectangular shape (e.g., rounded rectangular shape) and may be disposed closer to the periphery of the secondary floor plug 144 than the center of the secondary floor plug 144, although example embodiments are not limited thereto.

The secondary floor plug 144 may additionally define a group of ports 145b configured to allow access to one or more control rods 218. The group may include three, circular ports 145b that are disposed slightly off-center, although example embodiments are not limited thereto. While various configurations and combinations are disclosed above in connection with the sizes, shapes, quantities, and locations of the ports defined by the primary floor plug 142 and the secondary floor plug 144, it should be understood that other configurations and combinations are possible depending on the component type and layout of the underlying reactor head 210'.

Figure 7:
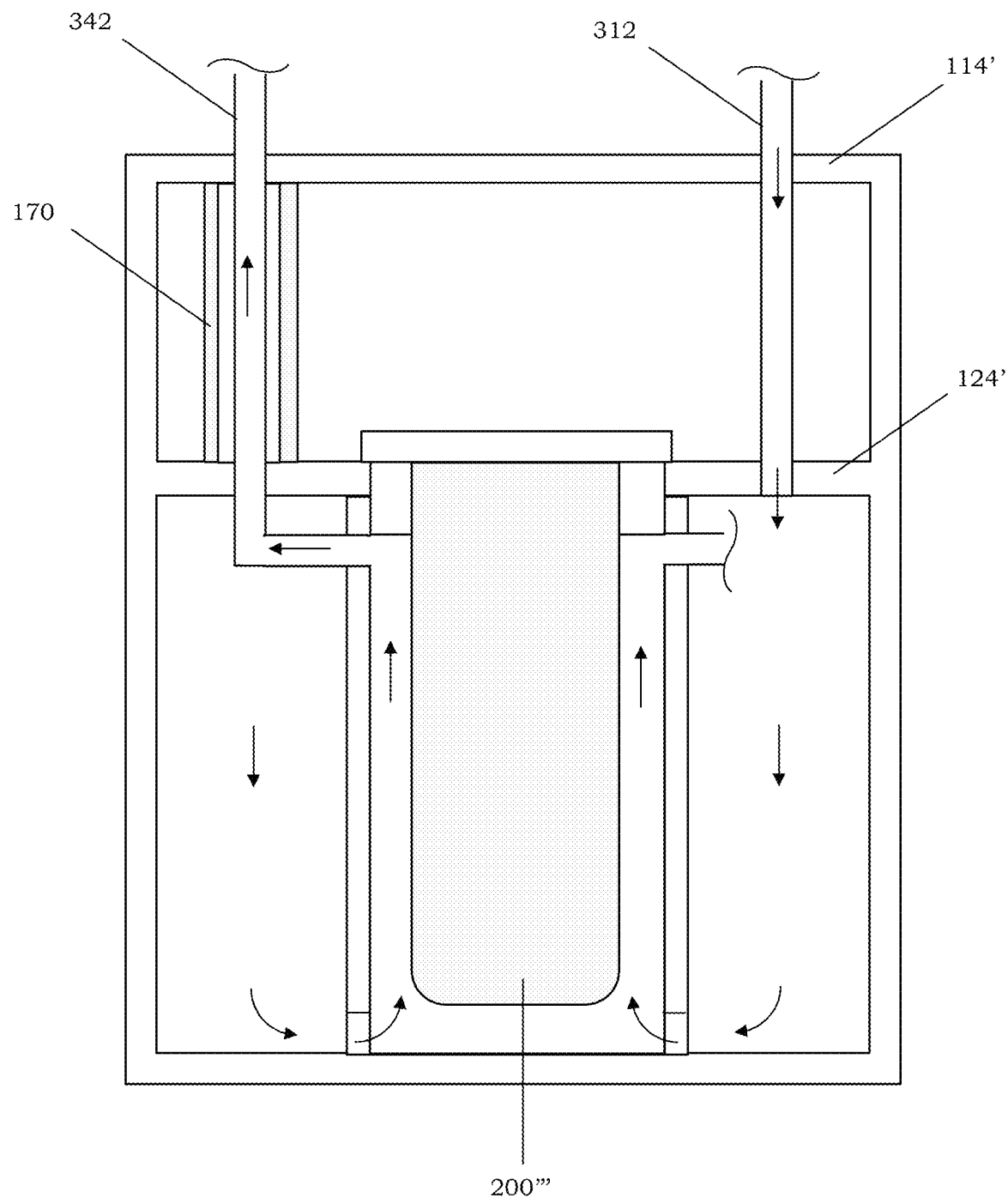
FIG. 7 is a cross-sectional view of the head access area of a nuclear reactor facility according to an example embodiment.

FIG. 7 is a cross-sectional view of the head access area of a nuclear reactor facility according to an example embodiment. Referring to FIG. 7, one or more structural sleeves 170 may be disposed between the refueling access area (RAA) floor 114' and the head access area (HAA) floor 124'. The structural sleeves 170 are configured to support the refueling access area floor 114' while allowing the plurality of ducts (e.g., outlet duct 342 and/or inlet duct 312) of the auxiliary cooling system to pass therethrough. As a result, the refueling access area floor 114' may have a thinner and stiffer construction. In one instance, each of the structural sleeves 170 may be in a form of a hollow cylinder. Alternatively, in other instances, each of the structural sleeves 170 may have a different form that corresponds more to a cross-sectional shape of the ducts (e.g., sleeves with square, rectangular, or trapezoidal cross-sections). In FIG. 7, an outlet duct 342 (e.g., hot duct) is shown as extending through a structural sleeve 170. Notably, although not shown, it should be understood that the inlet duct 312 (e.g., cold duct) may also extend through a structural sleeve 170. As previously discussed, cooling air discharged from the inlet duct(s) 312 enters an annulus defined in part by the reactor vessel 200''' where it becomes heated air that is directed (e.g., via a hot plenum ring header) to the outlet duct(s) 342.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A nuclear reactor facility comprising:
a reactor building having a visible section above a ground level and a buried section below the ground level;
a reactor vessel containing a fuel core and housed within the buried section of the reactor building below the ground level; and
an auxiliary cooling system including a plurality of ducts integrated with the reactor building and configured to passively cool the reactor vessel via natural air circulation, the plurality of ducts of the auxiliary cooling system includes inlet ducts and outlet ducts the inlet ducts configured to direct cooling air into a cold plenum defined by an inner surface of a silo wall and an outer surface of a reactor pedestal,
wherein a profile of the buried section is a straight cylinder defined by the silo wall.

2. The nuclear reactor facility of claim 1, wherein the reactor building defines a refueling access area and a head access area below the refueling access area.

3. The nuclear reactor facility of claim 2, wherein the refueling access area is at or above the ground level, and the head access area is below the ground level.

4. The nuclear reactor facility of claim 2, wherein the refueling access area includes a refueling access floor, and the head access area includes a head access floor below the refueling access floor.

5. The nuclear reactor facility of claim 4, wherein the reactor building includes a plurality of structural sleeves between the refueling access floor and the head access floor, the plurality of structural sleeves configured to support the refueling access floor while allowing the plurality of ducts of the auxiliary cooling system to pass therethrough.

6. The nuclear reactor facility of claim 4, wherein the reactor building includes radial floor beams embedded in at least one of the refueling access floor or the head access floor.

7. The nuclear reactor facility of claim 6, wherein the radial floor beams include a plurality of diametrically-opposed beams arranged around a central, longitudinal axis of the reactor vessel.

8. The nuclear reactor facility of claim 6, wherein each of the plurality of ducts to the auxiliary cooling system includes a plurality of inlet ducts and a plurality of outlet ducts,
wherein the plurality of outlet ducts extend radially outward between adjacent pairs of the radial floor beams.

9. The nuclear reactor facility of claim 4, the auxiliary cooling system includes a hot plenum ring header disposed below the head access floor and around the reactor vessel, the hot plenum ring header configured to collect heated air rising along the reactor vessel.

10. The nuclear reactor facility of claim 9, wherein the hot plenum ring header is connected to and configured to direct the heated air to the outlet ducts.

11. The nuclear reactor facility of claim 10, wherein the cold plenum is below the head access floor.

12. The nuclear reactor facility of claim 10, wherein the auxiliary cooling system includes a cold plenum ring header disposed below the hot plenum ring header and connected to the inlet ducts.

13. The nuclear reactor facility of claim 12, wherein the cold plenum ring header is configured to direct cooling air from the inlet ducts to a riser annulus adjacent to the reactor vessel.

14. The nuclear reactor facility of claim 1, wherein the plurality of ducts of the auxiliary cooling system extend through one or more sidewalls of the reactor building.

15. The nuclear reactor facility of claim 1, wherein the plurality of ducts are arranged in an array that follows an outer contour of a circular cross-section of the reactor vessel.

16. The nuclear reactor facility of claim 1, wherein the buried section of the reactor building includes a cylindrical silo, and the plurality of ducts are arranged in an array that follows an inner contour of a circular cross-section of the cylindrical silo.

17. The nuclear reactor facility of claim 1, wherein the plurality of ducts are arranged in opposing arrays of circular segments around the reactor vessel.

18. A nuclear reactor facility comprising:
a reactor building having a visible section above a ground level and a buried section below the ground level;
a reactor vessel containing a fuel core and housed within the buried section of the reactor building below the ground level; and
an auxiliary cooling system including a plurality of ducts integrated with the reactor building and configured to passively cool the reactor vessel via natural air circulation,
wherein the reactor building defines a refueling access area and a head access area below the refueling access area,
wherein the refueling access area includes a refueling access floor, and the head access area includes a head access floor below the refueling access floor, and
wherein the refueling access floor defines an opening and includes a floor plug rotatably-mounted within the opening, the floor plug configured to permit access to the reactor vessel via a rotation of the floor plug.

19. The nuclear reactor facility of claim 18, wherein the floor plug is in a form of a primary floor plug and a secondary floor plug concentrically incorporated with the primary floor plug, the primary floor plug defining at least one primary port, the secondary floor plug defining at least one secondary port, the primary floor plug and the secondary floor plug configured to permit access to the reactor vessel via independent rotations of at least the primary floor plug or the secondary floor plug.

20. The nuclear reactor facility of claim 18, wherein the visible section and the buried section of the reactor building have a continuous, cylindrical form.

21. The nuclear reactor facility of claim 20, wherein the buried section of the reactor building includes a first wing extension configured to facilitate a pathway for at least one of piping or cabling to pass from the reactor building to an adjacent building.

22. The nuclear reactor facility of claim 21, wherein the buried section of the reactor building includes a second wing extension oppositely disposed from the first wing extension.

23. A nuclear reactor facility comprising:
- a reactor building having a visible section above a ground level and a buried section below the ground level;
- a reactor vessel containing a fuel core and housed within the buried section of the reactor building below the ground level; and
- an auxiliary cooling system including a plurality of ducts integrated with the reactor building and configured to passively cool the reactor vessel via natural air circulation,
- wherein the reactor building defines a refueling access area and a head access area below the refueling access area,
- wherein the refueling access area includes a refueling access floor, and the head access area includes a head access floor below the refueling access floor,
- wherein the reactor building includes radial floor beams embedded in at least one of the refueling access floor or the head access floor,
- wherein each of the plurality of ducts of the auxiliary cooling system extends between an adjacent pair of the radial floor beams, and
- wherein each of the plurality of ducts of the auxiliary cooling system has a trapezoidal cross-section and is oriented to correspond to a truncated wedge-shaped space defined by adjacent radial floor beams.

* * * * *